(12) United States Patent
du Toit et al.

(10) Patent No.: US 7,034,768 B2
(45) Date of Patent: Apr. 25, 2006

(54) ANTENNA SYSTEM

(75) Inventors: Leendert Johannes du Toit, Somerset-West (ZA); Robert Lehmensiek, Somerset-West (ZA)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 10/895,765

(22) Filed: Jul. 21, 2004

(65) Prior Publication Data

US 2005/0062665 A1 Mar. 24, 2005

Related U.S. Application Data

(66) Substitute for application No. 60/505,511, filed on Sep. 24, 2003.

(51) Int. Cl.
*H01Q 1/42* (2006.01)
*H01Q 1/36* (2006.01)

(52) U.S. Cl. ..................................... 343/789
(58) Field of Classification Search ................ 343/789, 343/700 MS, 709, 898; 340/635, 644, 647; 324/536, 126
See application file for complete search history.

(56) References Cited

U.S. PATENT DOCUMENTS

| | | | | |
|---|---|---|---|---|
| 4,511,843 A | * | 4/1985 | Thoraval | 324/338 |
| 4,697,190 A | * | 9/1987 | Oswald | 343/789 |
| 5,553,407 A | | 9/1996 | Stump | 37/348 |
| 5,659,985 A | | 8/1997 | Stump | 37/348 |
| 5,704,142 A | | 1/1998 | Stump | 37/348 |
| 5,720,354 A | | 2/1998 | Stump et al. | 175/26 |
| 5,819,859 A | | 10/1998 | Stump et al. | 175/26 |
| 5,867,117 A | | 2/1999 | Gogineni et al. | 342/22 |
| 5,904,210 A | | 5/1999 | Stump et al. | 175/45 |
| 6,111,548 A | * | 8/2000 | Braunlich et al. | 343/789 |

* cited by examiner

*Primary Examiner*—Shih-Chao Chen
*Assistant Examiner*—Ephrem Alemu
(74) *Attorney, Agent, or Firm*—Mark E. Fejer

(57) ABSTRACT

An underground telemetry system having an antenna system having at least one metallic radiating element having a single or a dual top loaded folded monopole configuration and disposed within a metallic housing and having RF electronics to self-calibrate and tune the input impedance of the antenna elements.

14 Claims, 9 Drawing Sheets

ANTENNA SYSTEM

CROSS-REFERENCE TO RELATED APPLICATION

This application claims the benefit of provisional U.S. patent application Ser. No. 60/505,511, filed Sep. 24, 2003.

BACKGROUND OF THE INVENTION

1. Field of the Invention

This invention relates to a radar-based obstacle avoidance sensor for underground operations. More particularly, this invention relates to an antenna system suitable for use in guided underground directional drilling applications and particularly suitable for use in horizontal directional drilling applications. The system allows for the detection of underground utilities and other buried objects at a distance sufficient to allow the drill to avoid these obstacles. Although particularly suitable for use in directional drilling operations, it is not limited to this application. It may be used in any application where space is limited and sensing of targets in opaque materials is required. The radar design is a novel implementation of a Stepped Frequency Continuous Ground Wave Penetrating Radar designed to fit inside the drill head of a horizontal directional drill or in other applications where space requirements are restrictive. The system consists of the electronics to generate and receive the radar signals, an adaptive antenna designed specifically for various soil conditions, communications and power electronics to allow the radar to be controlled via a single conductor in the drill-string and a Human Machine Interface that performs display, storage and processing functions.

The radar generates continuous wave frequencies typically over a 400 MHz to 1000 MHz bandwidth. This signal is applied to the terminals of an electronically matched antenna that radiates energy ahead of the drill head. The scattered energy from a target, for each frequency, is received by the radar and converted to a digital signal. This data is calibrated and converted to the spatial domain and then transmitted to the Human Machine Interface via the drill string. The Human Machine Interface typically, but not necessarily, provides a simple A-scope radar interface that tracks the targets ahead of the drill. The HMI also interfaces to the drill hardware to allow for automatic shutdown of the drill if utilities, such as water or gas pipelines, are encountered in the drill path.

2. Description of Related Art

Guided directional drilling equipment is being used more often for the installation of underground utilities. These trenchless installations offer significant advantages over trenching operations, including ease of installation in inaccessible areas and lower costs. However, with this installation ease and lower cost comes the potential hazard of cutting existing underground utilities and the significant cost incurred for repair and loss of service. Even with the use of surface locating technology and One Call services, existing utilities are regularly cut. Even though not all utility hits are the result of directional drilling operations, the magnitude of the problem is nevertheless substantial. Companies responsible for cuts are also being charged for revenue loss in addition to repair costs. Hence, to reduce the risk of utility damage it is essential to develop new techniques, other than standard surface locating methods, to locate utilities in the path of and adjacent to new guided drill bores.

Other than standard pipe and cable locators, the most commonly applied geophysical technique to locate utilities is ground penetrating radar. Surveys are normally conducted from the surface and the location and depth to potential utilities are determined from an analysis of reflected energy. Other techniques that have been used include magnetic field sensors, seismic or acoustic techniques, and electromagnetic induction sensors. All these techniques are most commonly applied from the surface and, as such, provide no information as drilling progresses on conditions in the immediate vicinity of the drill. Errors in lateral and depth locations result in utility cuts, both as the drill advances and when the hole is subsequently reamed. According to users, most utility hits occur on the back ream. While utilities are missed as the pilot bore is drilled, they are close enough laterally that they are cut as the reamer is pulled back through the hole. Hence, any drill head technique needs to be able to look both ahead of the drill and to the side. This will assist in the avoidance of utilities directly in its path, when the hole is initially drilled and when the hole is reamed during the product installation phase.

While not applicable in all soil types, ground penetrating radar (GPR) provides one of the fastest and most accurate determinations of target location of any geophysical sensing technique. This rapid data acquisition feature of GPR is essential, since with an advancing drill stem, obstacle avoidance information must be acquired and evaluated rapidly. A means of recording the location of utilities encountered during drilling must be devised. In addition to providing immediate assistance, these data provide input for a database of as-built conditions of pre-existing utilities.

As important as high signal to noise ratio data collection is the presentation of data in a manner that is easily interpreted. Simultaneous rotation and advance of the drill string will result in data that do not necessarily appear the same as that normally collected from surface surveys. Analyses of the expected returns of different utilities at different relative orientations is thus desirable. Because of the rapid advance rate, the drill operator must be able to identify and react to utilities quickly. Alternatively, the drill should be linked to interlock circuits that provide an automatic shutdown if utilities are approached too rapidly for operator intervention. Processing and display must be provided in real time.

There are at least two significant problems associated with conventional antenna systems. The first such problem is non-optimal and/or uncontrollable input impedance properties across the frequency band of interest and a strong dependence of these properties on the electromagnetic constituent parameters of the surrounding medium into which the radiation is directed. The second problem is the inability to effectively concentrate the radiation away from perpendicular to the host, or stated differently, an inability to create a forward-looking radiation lobe.

SUMMARY OF THE INVENTION

It is one object of this invention to provide a method and apparatus for detection and avoidance of underground objects during subterranean drilling operations.

It is another object of this invention to provide a method and apparatus for detection and avoidance of underground objects in real time during subterranean drilling operations.

It is another object of this invention to provide a method and apparatus for reducing errors in lateral and depth locations during subterranean drilling operations.

It is yet another object of this invention to provide a method and apparatus for detection and avoidance of underground objects during subterranean drilling operations which is conducted local to the drill head rather than from above ground.

It is still a further object of this invention to provide a method and apparatus for detection and avoidance of underground objects during subterranean drilling operations both as the drill advances and when the hole is subsequently reamed, particularly during the back ream.

It is yet a further object of this invention to provide an underground radar ground penetrating system for an underground drilling application in which the antenna system produces a forward-looking radiation lobe, where forward-looking means the direction of forward travel of the drill head.

These and other objects of this invention are addressed by an antenna system comprising a solid metallic cylindrical element having opposed first and second ends and forming a cavity having at least one peripheral wall along a longitudinal section thereof. At least one metallic radiating element adapted to radiate a radiation lobe substantially only in a direction of the first end and/or the second end is disposed within the cavity. In this manner, the system is able to detect an obstacle either directly ahead of the drill head as the drill advances or directly behind the drill head as the drill is withdrawn. A filler material is disposed within the cavity, which is covered by a radome that is flush with the outer surface of the metallic cylindrical element. The crux of this invention lies in the requirement that the antenna radiate with respect to the direction of drilling a forward-looking lobe and a backward-looking lobe, and that the antenna input impedance characteristics can be measured and controlled.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

The invention disclosed and claimed herein is an antenna system for use in the detection of obstacles in the drill path of guided directional drilling equipment, which antenna system can be embedded in a relatively small conducting housing or host. This antenna system can radiate a radiation lobe whose major beam peak is not predominantly perpendicular to the direction of drilling, but rather is in line with the direction of drilling. Although discussed herein as being disposed in a metallic conducting cylindrical host or housing, this should in no way be interpreted as limiting the shape or size of the host/housing. In accordance with one preferred embodiment of this invention, the conducting host for the radiating element is a drill head or drill string typically, but not necessarily, associated with a horizontal directional drilling rig. In addition, although discussed herein in terms of applicability to subterranean drilling applications, this invention is suitable for use in any medium having dielectric and magnetic properties different from free space. Underground soil is but one example of such a medium. In addition to in-situ drill head radar for utility mapping and location, possible applications of the antenna system of this invention include roadway and bridge deck inspection, general obstacle detection and avoidance, concrete structure analysis, environmental site evaluation, geotechnical applications for civil engineers, geologists and geophysicists, archeology, forensics and research.

The antenna system of this invention comprises two major components—radiating elements and control electronics. The frequency of operation for both the radiating elements and the control electronics is preferably in the range of about 1 to about 2000 MHz. The radiating elements are embedded in pockets or cavities in a conducting host, typically a solid metallic cylinder, and may be spaced in a regular or irregular grid in both dimensions (axial and in circumference). The control electronics is the interface between a 2-port continuous wave source-receiver system and the radiating elements and has three principal operating modes—1) self-calibration mode, 2) radiating element impedance tuning mode, and 3) radar mode. The control electronics include tuning circuitry comprising an array of delay lines typically incorporated in a printed circuit board or otherwise properly interconnected RF circuitry. By connecting these lines in a switchable combination, the radiating elements may be tuned and transformed to 50 ohms at a frequency of interest. This insures optimal power transmission into the external medium such as ground. Combinations and variations of the three principal functions should be considered as a subset of auxiliary support functions, and these may be performed intermittently while predominantly in the radar mode.

Figure 1:
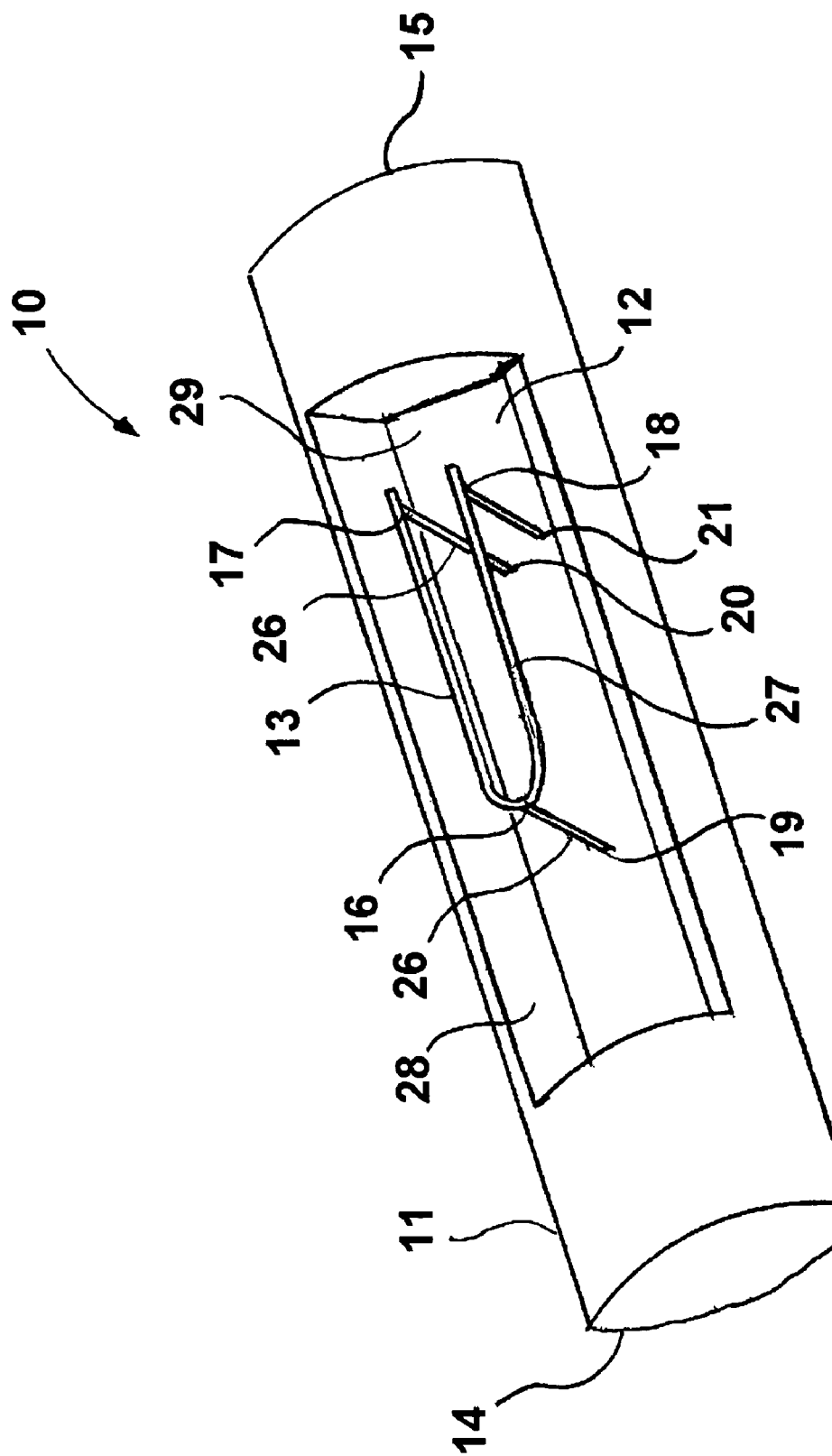
FIG. 1 is a perspective view of an antenna system comprising one dual top loaded folded monopole radiating element in accordance with one embodiment of this invention.
Figure 3:
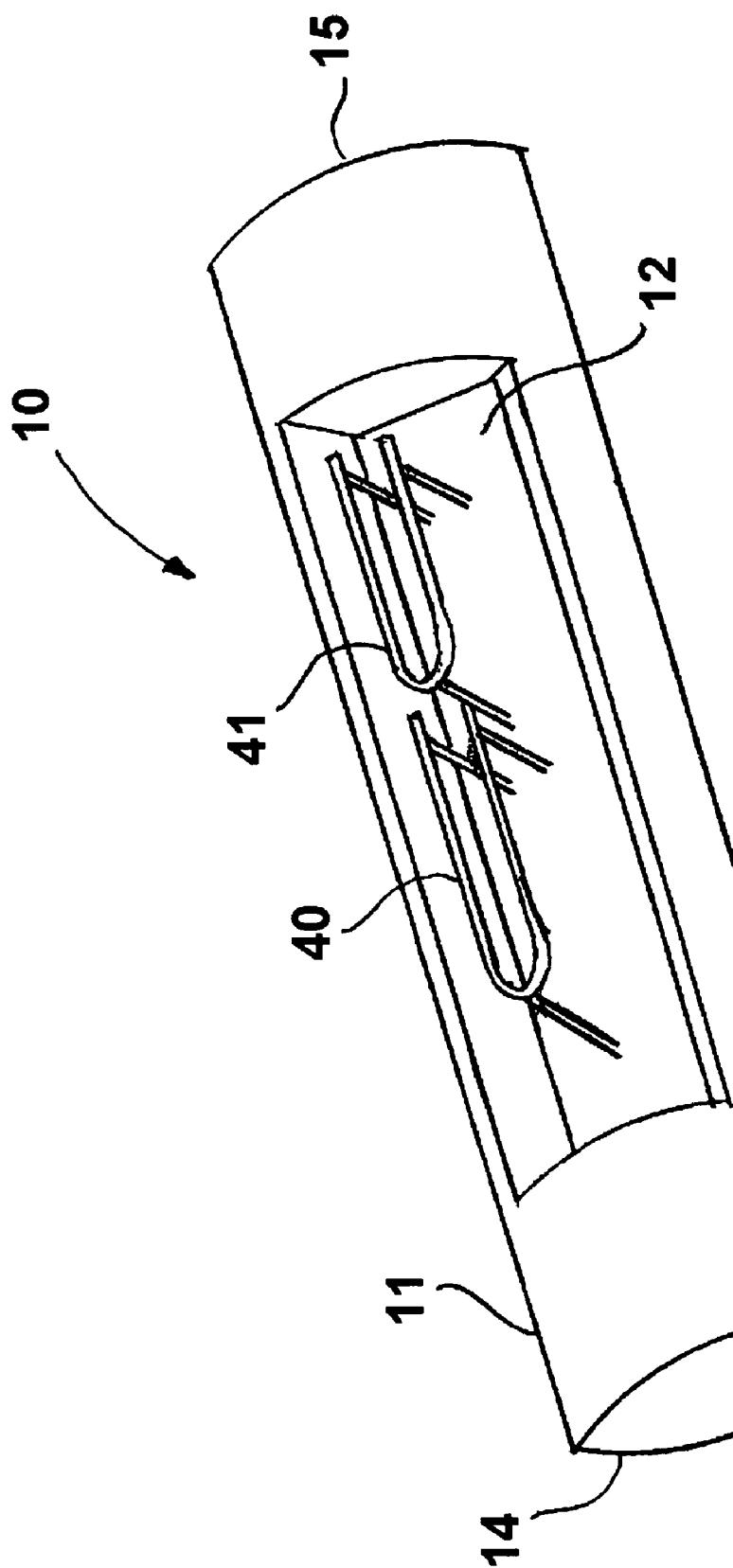
FIG. 3 is a perspective view of an antenna system comprising a plurality of dual top loaded folded monopole radiating elements in accordance with another embodiment of this invention.

FIG. 1 shows an antenna system 10 suitable for use in an obstacle avoidance sensor for underground operations employing ground penetrating radar in accordance with one embodiment of this invention. As shown, antenna system 10 comprises a conducting host in the form of a solid metallic cylindrical element 11 having a first end 14 and an opposed second end 15 and forming a pocket or cavity 12 having peripheral walls 28,29. Disposed within cavity 12 is at least one radiating element 13. As shown in FIG. 3, multiple such radiating elements 40, 41 may be disposed within cavity 12. Returning to FIG. 1, radiating element 13 comprises a metallic material having a form selected from the group consisting of wire, rod, strip and ribbon. Said at least one metallic radiating element 13 comprises at least one elongated segment 27 oriented parallel to a longitudinal axis of the solid metallic cylindrical element and at least one connecting segment 26 connecting the at least one elongated segment 27 with peripheral wall 29. The at least one elongated segment 27 and connecting segments 26 are connected by conductive connections 16, 17 and 18. Radiating element 13 is excited with RF at at least one of excitation points 19, 20, 21. Unused excitation points in accordance with one embodiment of this invention are short-circuited to the metallic peripheral wall 29 of the cavity 12. In accordance with another embodiment of this invention, the unused excitation points are connected to the metallic peripheral wall 29 by means of lumped components, such as capacitor and/or inductor and/or resistor networks or active RF devices such as PIN diodes.

Figure 2:
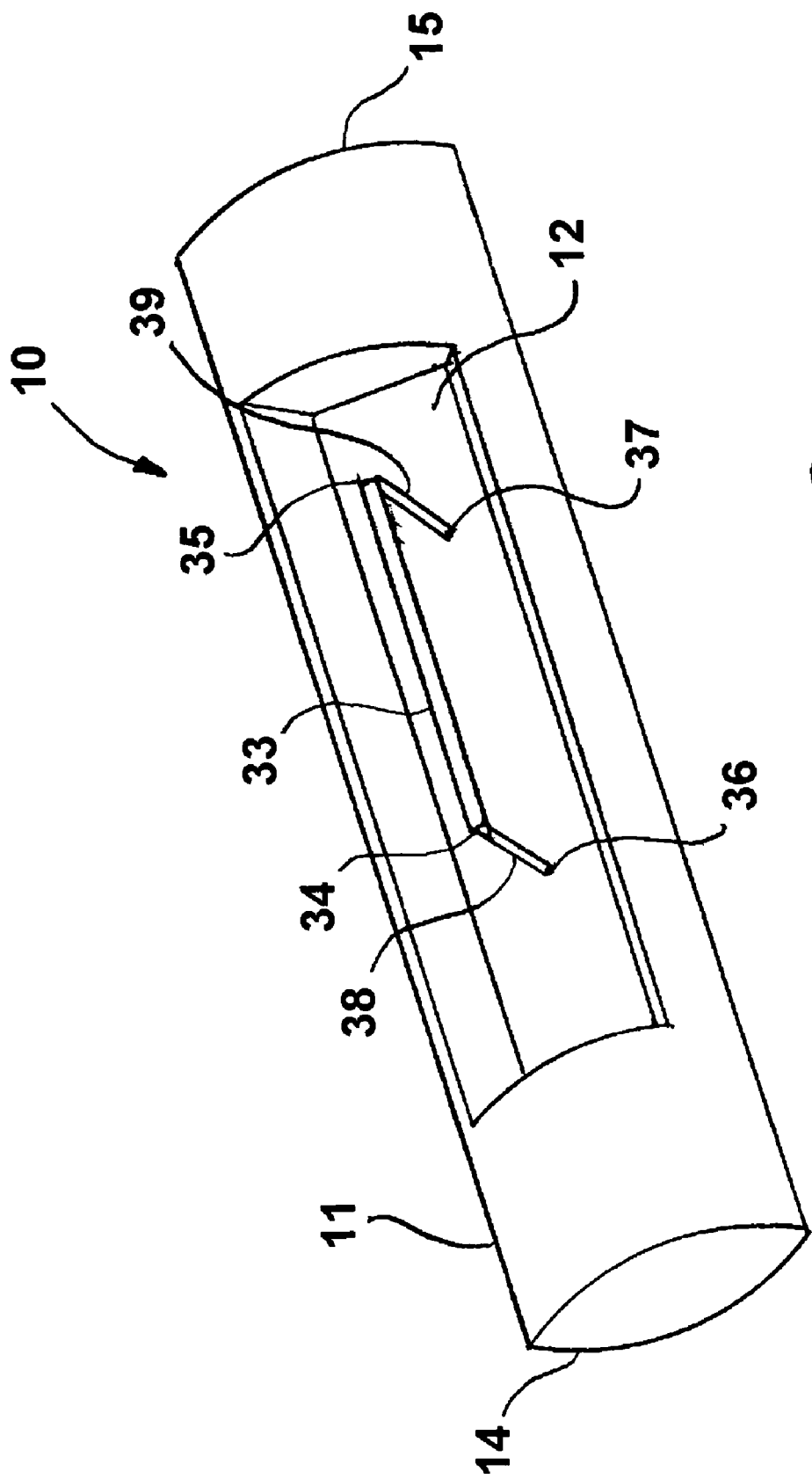
FIG. 2 is a perspective view of an antenna system comprising one single top loaded folded monopole radiating element in accordance with another embodiment of this invention.

In accordance with one embodiment as shown in FIG. 2, the radiating element comprises a single elongated segment 33 and two connecting segments 38, 39 with conductive connections 34, 35 and RF excitation points 36, 37. This configuration is referred to as a single top loaded folded monopole. In contrast thereto, the radiating element shown, for example, in FIG. 1, is referred to as a dual top loaded folded monopole.

Figure 4:
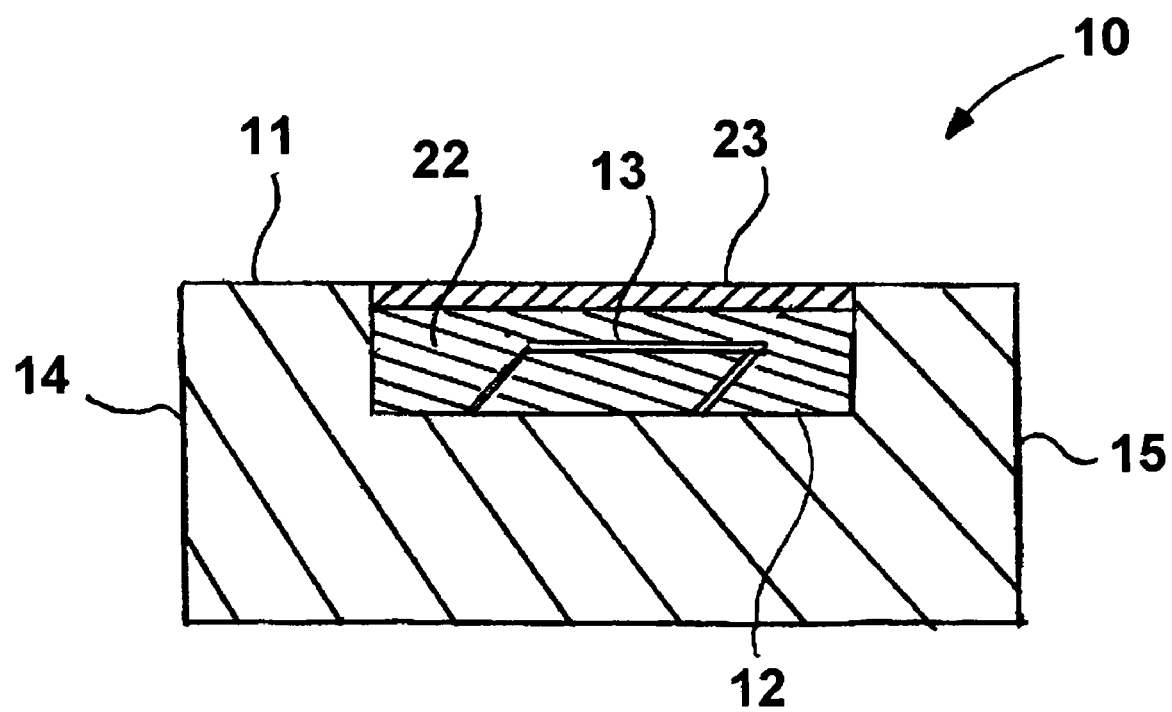
FIG. 4 is a lateral cross-sectional view of an antenna system in accordance with one embodiment of this invention.

As shown in FIG. 4, cavity 12 is filled with a filler material 22 and covered by a radome 23, which radome is flush with the exterior surface of metallic cylindrical element 11. The radome material of choice is one which interacts with the electromagnetic function of the radiating element and filled cavity. Suitable radome materials include wear resistant Ultra-High-Molecular-Weight plastic. The cavity filler material of choice is one which is compatible with the constituent parameters of the medium into which the radiation is to be directed. Suitable cavity filler materials include artificial dielectric material, for example doped industrial rubber.

Figure 5:
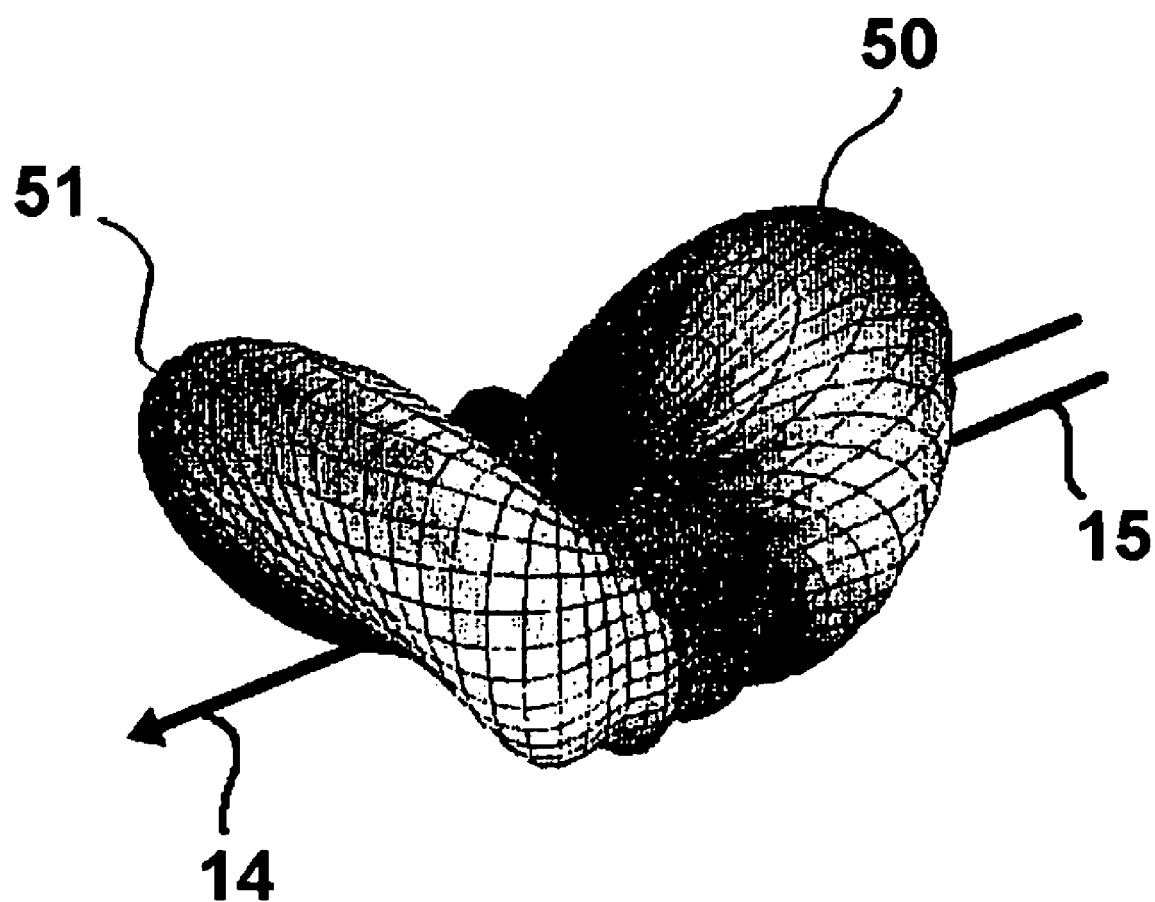
FIG. 5 is a diagram showing a typical radiation pattern obtained from a single metallic radiating element in accordance with one embodiment of this invention.
Figure 6:
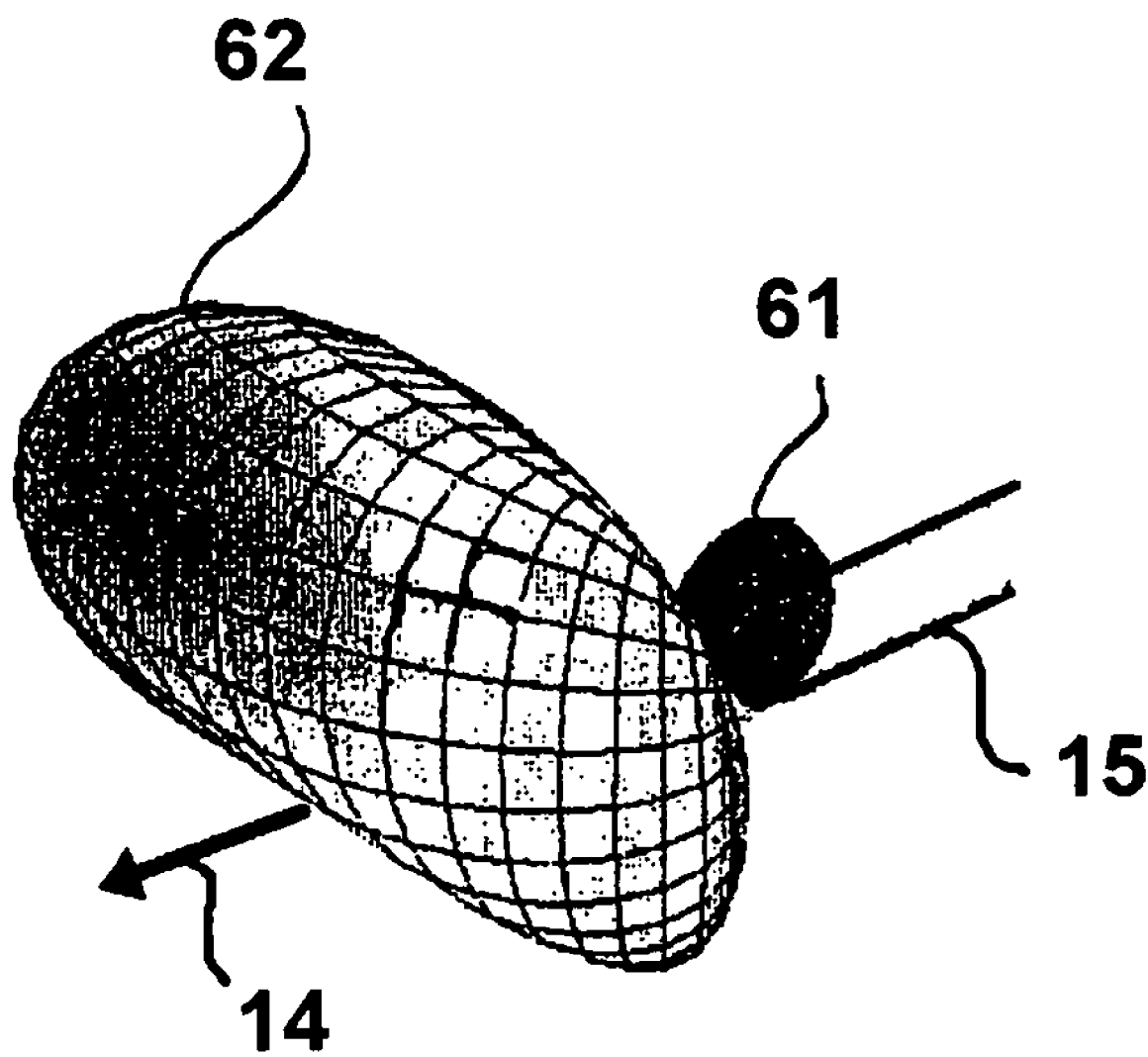
FIG. 6 is a diagram showing a typical radiation pattern obtained from a dual metallic radiating element in accordance with one embodiment of this invention.

In general, radiation patterns comprising two major beam peaks 50, 51 which are directed predominantly between perpendicular and the two axial directions as shown in FIG. 5 may be generated by the antenna system of this invention. Depending upon the radiating element implementation, one of these two major beam peaks 61 can be suppressed in magnitude compared to the un-suppressed (and thus enhanced) peak 62 as shown in FIG. 6.

The radiating element typically presents an input impedance with a low or high radiation resistance (<50 ohm or >50 ohm) in series with a large frequency dependent reactance. One method for tuning this impedance to 50 ohms (at a given frequency) is to insert a 50 ohm digital delay line in series with the radiating element. The delay line length is then adjusted until the impedance, as seen into the delay line, is without reactance and thus real, and either less than or more than 50 ohms. Another inline component can then be used to transform this resistance to 50 ohms. This impedance tuning method will introduce a deterministic dispersion, or radiation phase center displacement, to the fields radiated by the tuned element, referred to some fixed physical phase reference point in the feed line. In radar mode, this dispersion can and should be corrected mathematically.

Figure 7:
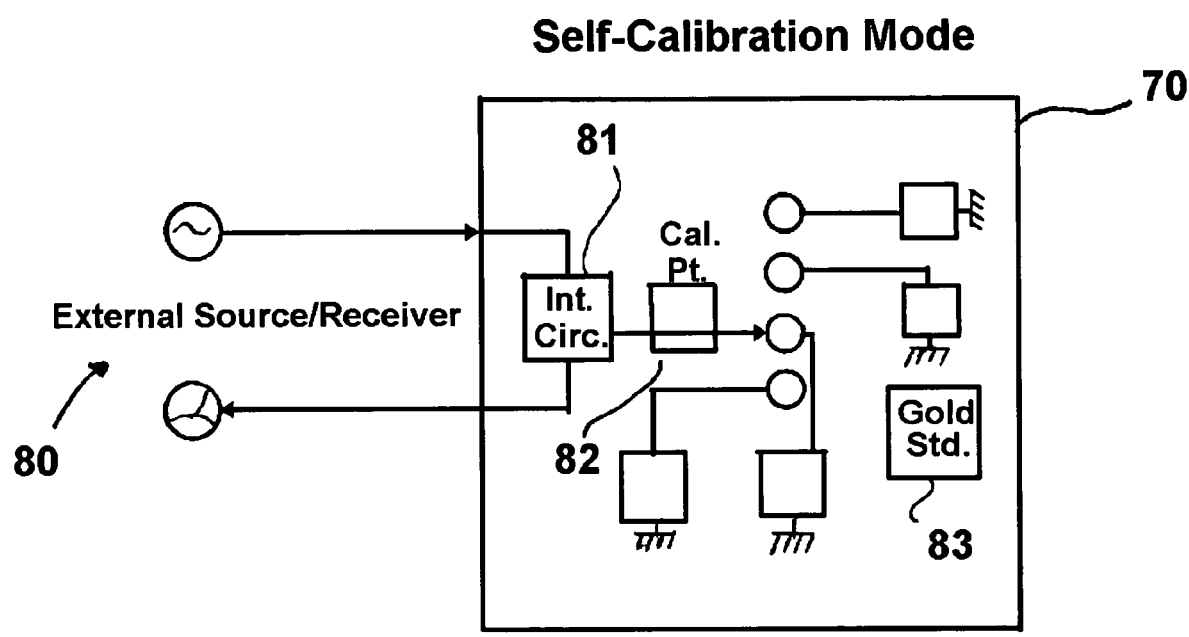
FIG. 7 is a schematic diagram of the control electronics circuitry for self-calibration of the antenna system in accordance with one embodiment of this invention.
Figure 8:
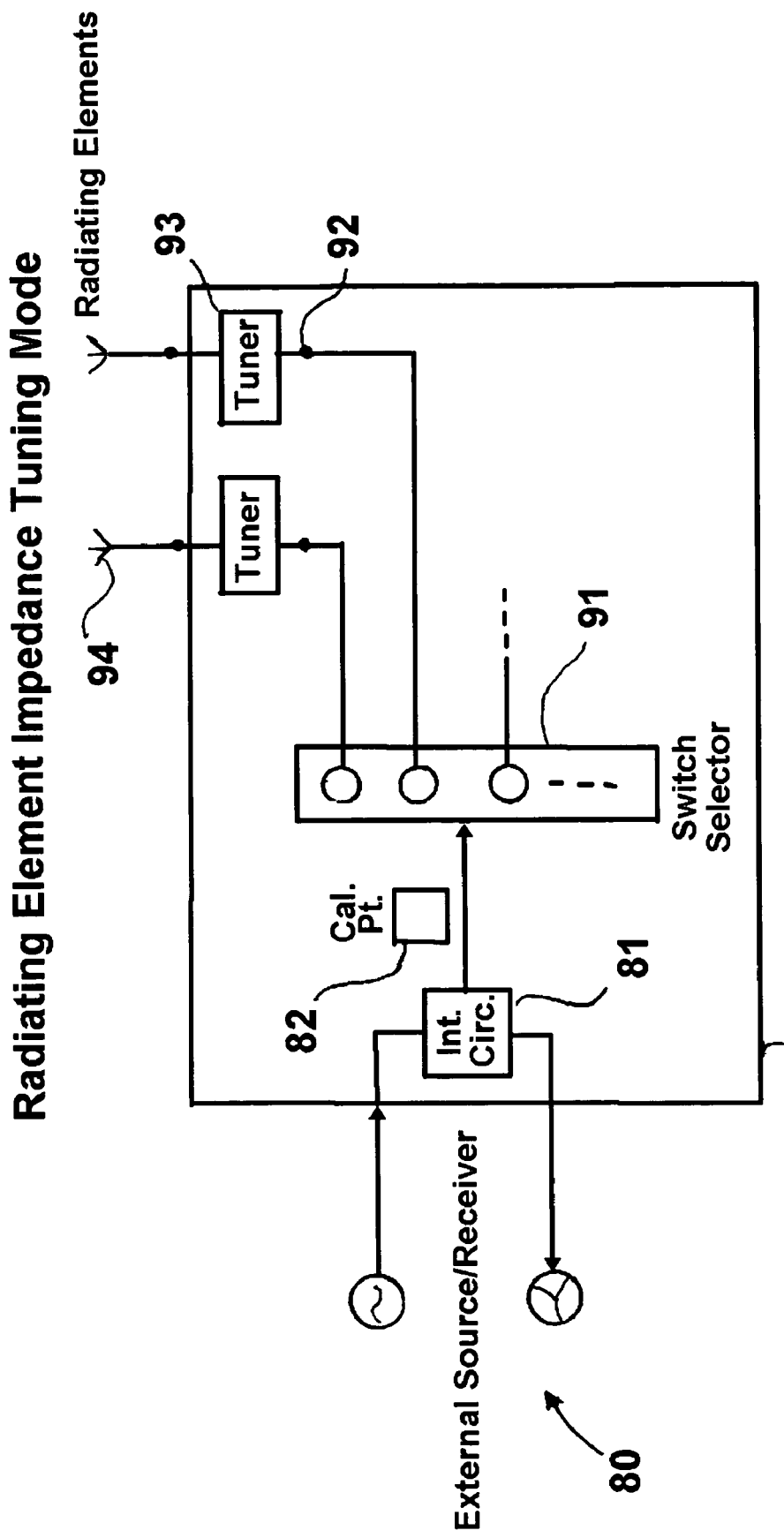
FIG. 8 is a schematic diagram of the control electronics circuitry for radiating element impedance tuning in accordance with one embodiment of this invention.
Figure 9:
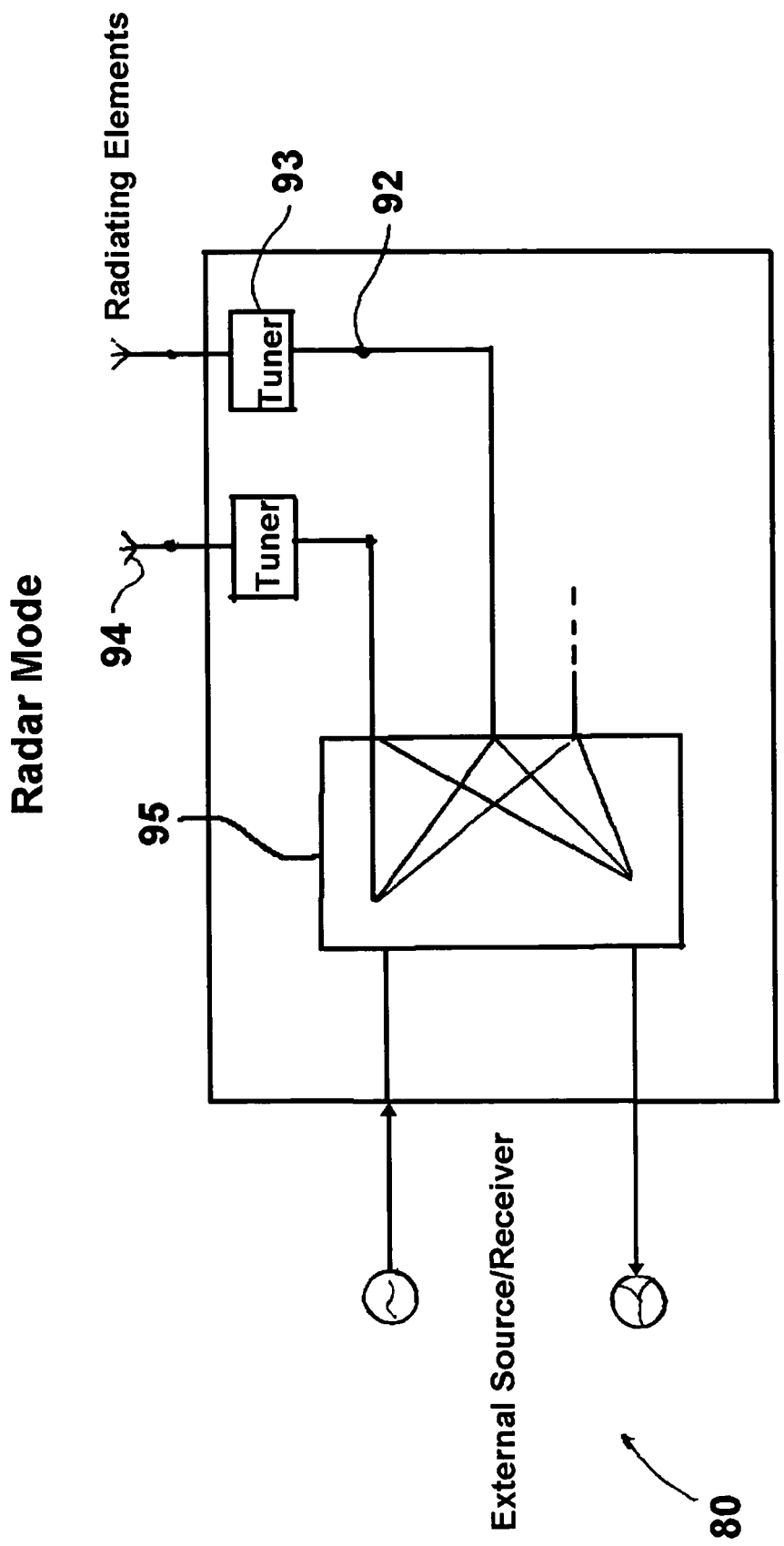
FIG. 9 is a schematic diagram of the control electronics circuitry for the antenna system in radar mode in accordance with one embodiment of this invention.

Control electronics for the antenna system in accordance with one embodiment of this invention are shown in FIGS. 7–9. The control electronics, which may be physically incorporated into a printed circuit board 70, comprise a switch network, solid state or otherwise, for routing RF signals, a number of a-priori known signal terminations and through-channels for calibration purposes (gold standards), impedance transformation components and some general RF circuitry, both in lumped form and distributed.

It will be understood that the switch network and 2-port continuous wave source-receiver system can be controlled by a standalone computing device, suitably programmed, and furthermore that this computing device can perform substantial mathematical operations on complex numbers and make logical decisions. An example of such a computing device is a personal computer and appropriate software, or an intelligent radar system. Such a computing device is a pre-requisite for the antenna system of this invention to function properly.

The antenna system of this invention has three typical modes of operation, shown in FIGS. 7–9. In the self-calibration mode (FIG. 7), the external source/receiver 80 and the internal circuitry 81 can be calibrated at a calibration point 82 using multiple gold standards 83. This is a one-port calibration, suitable for measuring the input impedance of a one-port load present (or to be presented) at the calibration point 82.

In the radiating element impedance tuning mode, shown in FIG. 8, using switch selector 91, the calibration point 82 may be physically connected and mathematically moved to input ports 92 of each of the tuning circuits 93 located in-line with each of the radiating elements 94. In such a sequential manner, each of the radiating elements 94 can be impedance tuned to present approximately 50 ohms at the particular frequency of interest, at its tuner input 92.

In the radar mode in which target returns can be detected, shown in FIG. 9, the source and receiver can be connected to one of the plurality of tuned radiating elements by the switching matrix 95. As previously discussed, gold standards are used to calibrate the circuit, to perform error correction and to correct for stray signals present in the RF circuitry.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. An antenna system comprising:
   one of a solid and a hollow metallic substantially cylindrical element having opposed first and second ends and forming a cavity along a longitudinal section thereof, said cavity having at least one peripheral wall;
   at least one metallic radiating element adapted to radiate a radiation lobe substantially only in a direction of at least one of said first end and said second end disposed within said cavity;
   a filler material disposed within said cavity; and
   a radome covering said cavity, said radome being flush with an outer surface of said metallic cylindrical element.

2. An antenna system in accordance with claim 1, wherein said at least one metallic radiating element comprises a metallic material having a form selected from the group consisting of wire, rod, strip and ribbon.

3. An antenna system in accordance with claim 2, wherein said at least one metallic radiating element comprises at least one elongated segment oriented parallel to a longitudinal axis of said solid metallic cylindrical element and at least one connecting segment connecting said at least one elongated segment with said at least one peripheral wall.

4. An antenna system in accordance with claim 1 further comprising at least one tuning means for self-tuning said antenna system and at least one calibration means for self-calibrating said antenna system and a source/receiver excitation system.

5. An antenna system in accordance with claim 4, wherein said at least one tuning means comprises means for tuning said at least one metallic radiating element to an impedance of about 50 ohms at a frequency of interest.

6. An antenna system in accordance with claim 5, wherein said tuning means comprises an array of delay lines connected in a switchable combination and physically incorporated into one of a printed circuit board and a discretely packaged RF circuitry.

7. An antenna system in accordance with claim 1, said antenna system integral with one of a drill head and a drill string of an in-ground directional drilling apparatus.

8. In an underground telemetry system comprising an antenna system comprising at least one metallic radiating element, the improvement comprising:
said at least one metallic radiating element having one of a single and a dual top loaded folded monopole configuration and disposed within a cylindrical metallic housing, said at least one metallic radiating element oriented to radiate a radiation lobe substantially only in a direction along an axis of said cylindrical metallic cylinder.

9. An underground telemetry system in accordance with claim 8, wherein said cylindrical metallic housing is a solid metallic cylinder having opposed first and second ends and forming a cavity along a longitudinal section thereof, said cavity having at least one peripheral wall.

10. An underground telemetry system in accordance with claim 9, wherein a filler material is disposed within said cavity and said cavity is covered by a radome which is flush with an outer surface of said solid metallic cylinder.

11. An underground telemetry system in accordance with claim 8, wherein said at least one metallic radiating element comprises a metallic material having a form selected from the group consisting of wire, rod, strip and ribbon.

12. An underground telemetry system in accordance with claim 8 further comprising at least one tuning means for self-tuning said antenna system and at least one calibration means for self-calibrating said antenna system.

13. An underground telemetry system in accordance with claim 12, wherein said at least one tuning means comprises means for tuning said at least one metallic radiating element to an impedance of about 50 ohms at a frequency of interest.

14. An underground telemetry system in accordance with claim 13, wherein said at least one tuning means comprises an array of delay lines connected in a switchable combination and physically incorporated into a printed circuit board.

* * * * *